(12) United States Patent
Styles et al.

(10) Patent No.: US 9,677,510 B2
(45) Date of Patent: Jun. 13, 2017

(54) SYSTEMS AND METHODS FOR TRANSIENT CONTROL

(71) Applicant: Ford Global Technologies, LLC, Dearborn, MI (US)

(72) Inventors: Daniel Joseph Styles, Canton, MI (US); Chris Paul Glugla, Macomb, MI (US); Thomas G. Leone, Ypsilanti, MI (US); Gregory Patrick McConville, Ann Arbor, MI (US); James Alfred Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 14/514,032

(22) Filed: Oct. 14, 2014

(65) Prior Publication Data

US 2016/0102636 A1    Apr. 14, 2016

(51) Int. Cl.

| F02B 47/08 | (2006.01) |
|---|---|
| F02M 25/07 | (2006.01) |
| F02D 41/00 | (2006.01) |
| F02B 37/18 | (2006.01) |
| F02D 13/02 | (2006.01) |
| F02M 26/43 | (2016.01) |
| F02D 37/02 | (2006.01) |
| F02D 41/30 | (2006.01) |

(52) U.S. Cl.
CPC ......... *F02M 25/0704* (2013.01); *F02B 37/18* (2013.01); *F02D 13/0219* (2013.01); *F02D 37/02* (2013.01); *F02D 41/005* (2013.01); *F02D 41/006* (2013.01); *F02D 41/0007* (2013.01); *F02D 41/008* (2013.01); *F02M 26/43* (2016.02); *F02D 41/307* (2013.01); *F02D 2041/001* (2013.01); *F02D 2041/0017* (2013.01); *Y02T 10/144* (2013.01); *Y02T 10/18* (2013.01); *Y02T 10/47* (2013.01)

(58) Field of Classification Search
CPC .................................................... F02D 41/005
USPC .................................................... 123/568.21
See application file for complete search history.

(56) References Cited

U.S. PATENT DOCUMENTS

| 4,179,892 A | * | 12/1979 | Heydrich ................ F02B 37/00 60/605.2 |
|---|---|---|---|
| 6,360,713 B1 | | 3/2002 | Kolmanovsky et al. |
| 6,434,466 B1 | | 8/2002 | Robichaux et al. |
| 6,561,145 B1 | | 5/2003 | Stockhausen et al. |
| 6,716,136 B2 | | 4/2004 | Hrovat et al. |

(Continued)

OTHER PUBLICATIONS

Leone, Thomas G. et al., "Systems and Methods for EGR Control," U.S. Appl. No. 14/298,733, filed Jun. 6, 2014, 45 pages.

(Continued)

*Primary Examiner* — Hung Q Nguyen
*Assistant Examiner* — Charles Brauch
(74) *Attorney, Agent, or Firm* — Julia Voutyras; McCoy Russell LLP

(57) ABSTRACT

Methods and systems are provided for reducing torque transients experienced when a dedicated EGR cylinder is transitioned in to or out of dedicated EGR mode. During a transition, each of an intake throttle and a wastegate is adjusted in opposing directions. Throttle and wastegate adjustments are coordinated with adjustments to spark timing and intake cam timing to provide sufficient torque reserve for the transition.

14 Claims, 5 Drawing Sheets

(56) References Cited

U.S. PATENT DOCUMENTS

| | | |
|---|---|---|
| 8,540,606 B2 | 9/2013 | Livshiz et al. |
| 8,561,599 B2 | 10/2013 | Gingrich et al. |
| 2009/0054206 A1* | 2/2009 | Tamba ................ F16H 61/0206 477/168 |
| 2009/0308070 A1* | 12/2009 | Alger, II ............. F02D 13/0238 60/602 |
| 2012/0023937 A1 | 2/2012 | Styles et al. |
| 2012/0204844 A1 | 8/2012 | Gingrich et al. |
| 2012/0285163 A1 | 11/2012 | Hayman et al. |
| 2013/0104540 A1* | 5/2013 | Maruyama ............ F02B 37/013 60/603 |
| 2013/0232952 A1* | 9/2013 | zur Loye ............ F02D 13/0242 60/274 |
| 2013/0340727 A1 | 12/2013 | Keating |
| 2014/0026872 A1 | 1/2014 | Kerns et al. |
| 2014/0196703 A1 | 7/2014 | Boyer et al. |

OTHER PUBLICATIONS

Ku, Kim H. et al., "Systems and Methods for EGR Control," U.S. Appl. No. 14/454,240, filed Aug. 7, 2014, 57 pages.

\* cited by examiner

SYSTEMS AND METHODS FOR TRANSIENT CONTROL

FIELD

The present description relates to systems and methods for improving torque transients in engine systems configured with a dedicated cylinder group for providing external EGR to other engine cylinders.

BACKGROUND AND SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, in-cylinder heat losses, as well as NOx emissions. As a result, fuel economy is improved, especially at higher levels of engine boost. Engines have also been configured with a sole cylinder (or cylinder group) that is dedicated for providing external EGR. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR cylinder group (e.g., to run rich), the EGR composition can be varied to include species such as hydrogen which improve the EGR tolerance of the engine and result in fuel economy benefits.

While the availability of EGR over a larger operating range provides fuel economy benefits, the fixed EGR rate also reduces the peak torque capability of the engine. In addition, catalyst warm-up may be degraded, particularly after an engine cold-start.

Various approaches may be used to reduce the EGR rate in such dedicated EGR systems during conditions when EGR reduction is required. One example approach shown by Gingrich et al. in US 20120204844 uses a diverter valve for diverting exhaust from the dedicated EGR cylinder to an exhaust location. By redirecting exhaust to a turbine location, peak torque output may be improved. However, the use of diverter valves may be cost prohibitive. In addition, they may have durability issues. Another example approach, shown by Boyer et al. in US20140196703, uses exhaust variable valve timing to direct exhaust from a dedicated EGR cylinder to the intake when EGR is required and direct exhaust away from the intake, towards a turbine, when EGR is not required. In still further examples, the dedicated EGR cylinder may be deactivated by deactivating fuel and spark to the cylinder.

However, the inventors herein have recognized potential issues with the above approaches. As an example, during transitions when exhaust flow from the dedicated EGR cylinder is being directed to the intake or redirected to the exhaust, such as when the dedicated EGR cylinder is being reactivated or deactivated, torque disturbances may be experienced. As such, it may be difficult to reduce the torque disturbances while concurrently maintaining accurate control of other engine operating parameters, such as air-fuel ratio, spark timing, and cam timing. The inventors herein have recognized that transients experienced during deactivation and reactivation of a dedicated EGR cylinder may have a substantially more complex relationship with engine torque output than the deactivation and reactivation of a regular engine cylinder (such as a cylinder that can be deactivated by selective fuel or valve deactivation). This is because in addition to exhaust gas being redirected from the dedicated EGR cylinder to a pre-turbine location, EGR is also being purged from the intake manifold. This results in conflicting torque changes as the exhaust being redirected to the pre-turbine location may increase peak torque while a delay in purging of EGR from the intake manifold results in torque loss from the dedicated EGR cylinder. As an example, even after exhaust from the dedicated EGR cylinder has been redirected away from the intake manifold, and intake airflow has been increased, due to delays in manifold filling, there may be a corresponding delay in purging EGR from the engine intake. As such, until the EGR has sufficiently purged, torque may be lower than desired. At the same time, turbocharger performance may be increased due to the redirection of exhaust to the pre-turbine location. Consequently, throttle adjustments may need to compensate for the balance between torque loss due to EGR and torque gain due to increased flow through the turbine. As another example, when EGR is desired and dedicated EGR operation is re-activated, the same delay in manifold filling may result in lower engine dilution than desired, and a resulting torque excursion. As such, until the EGR has been ramped up to the desired rate, there may be torque unevenness.

In one example, the above issues may be at least partly addressed by a method for an engine comprising: transitioning into and out of dedicated EGR cylinder operation while adjusting each of an intake throttle and an exhaust wastegate in opposing directions. In this way, torque transients incurred while EGR from a dedicated EGR cylinder is ramped-up or down, and while a dedicated EGR cylinder is activated and deactivated, can be decreased.

As an example, an engine system may be configured with a single dedicated EGR cylinder for providing external EGR to all engine cylinders. During conditions where EGR demand is low, such as when transitioning from a lower engine load to a higher engine load, the engine may be transitioned out of dedicated EGR cylinder operation by diverting exhaust from the dedicated EGR cylinder away from the EGR passage and engine intake, and towards the exhaust passage, upstream of an exhaust turbine. By redirecting exhaust away from the EGR passage, engine dilution provided by the dedicated EGR cylinder is reduced. Deactivating the EGR cylinder also results in engine output torque initially decreasing. Then, as the EGR in the intake manifold is used up and replaced with fresh air, the engine output torque increases. To reduce the torque unevenness involved with the transition out of dedicated EGR cylinder operation, during the transition from the lower engine load to the higher engine load, after switching exhaust from the dedicated EGR cylinder towards the exhaust turbine, each of an intake throttle and an exhaust wastegate are modulated to expedite purging of residuals from the intake manifold and refilling of the intake manifold with fresh air. The throttle and wastegate adjustment may be performed when the dedicated EGR cylinder is reactivated during an engine start only after an emission control device reaches a threshold temperature, such as a light-off temperature.

Specifically, during an initial phase of the transition, the throttle is moved from an initial, less open position corresponding to the lower load to a transient, more open position corresponding to a higher load via an overshoot position where the throttle is opened more than required at the final position. In other words, the throttle opening is increased more than required, and then transiently held at the more than required open position before being returned to the final position corresponding to the higher load. At the same time, an exhaust wategate is moved from an initial, more open position corresponding to the lower load to a transient, less open position corresponding to the higher load via an undershoot position where the wastegate is closed more than required at the final position. In other words, the wastegate opening is decreased more than required, and then transiently held at the more than required closed position before being returned to the final position corresponding to the higher load. In some embodiments, spark timing and cam timing may also be concurrently modulated. For example, during the transition out of dedicated EGR cylinder operation, while the intake throttle opening is increased, spark timing may be retarded while intake cam timing may be advanced. Then, when the throttle opening is returned to the final position, spark timing may be advanced back towards MBT while cam timing may be retarded back to a timing corresponding to the higher load.

In this way, external EGR can be varied by diverting exhaust from the dedicated EGR cylinder away from the intake, while reducing torque unevenness during the activating or deactivating using engine actuator adjustments. By subsequently adjusting the intake throttle position, the wastegate position, the spark timing, and the cam timing to "base" positions before the transition is completed, a torque surge anticipated when the EGR is replaced with fresh air can be averted. By reducing torque unevenness during conditions when EGR is ramped in or ramped out from a dedicated EGR cylinder, a smoother transition is enabled and engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
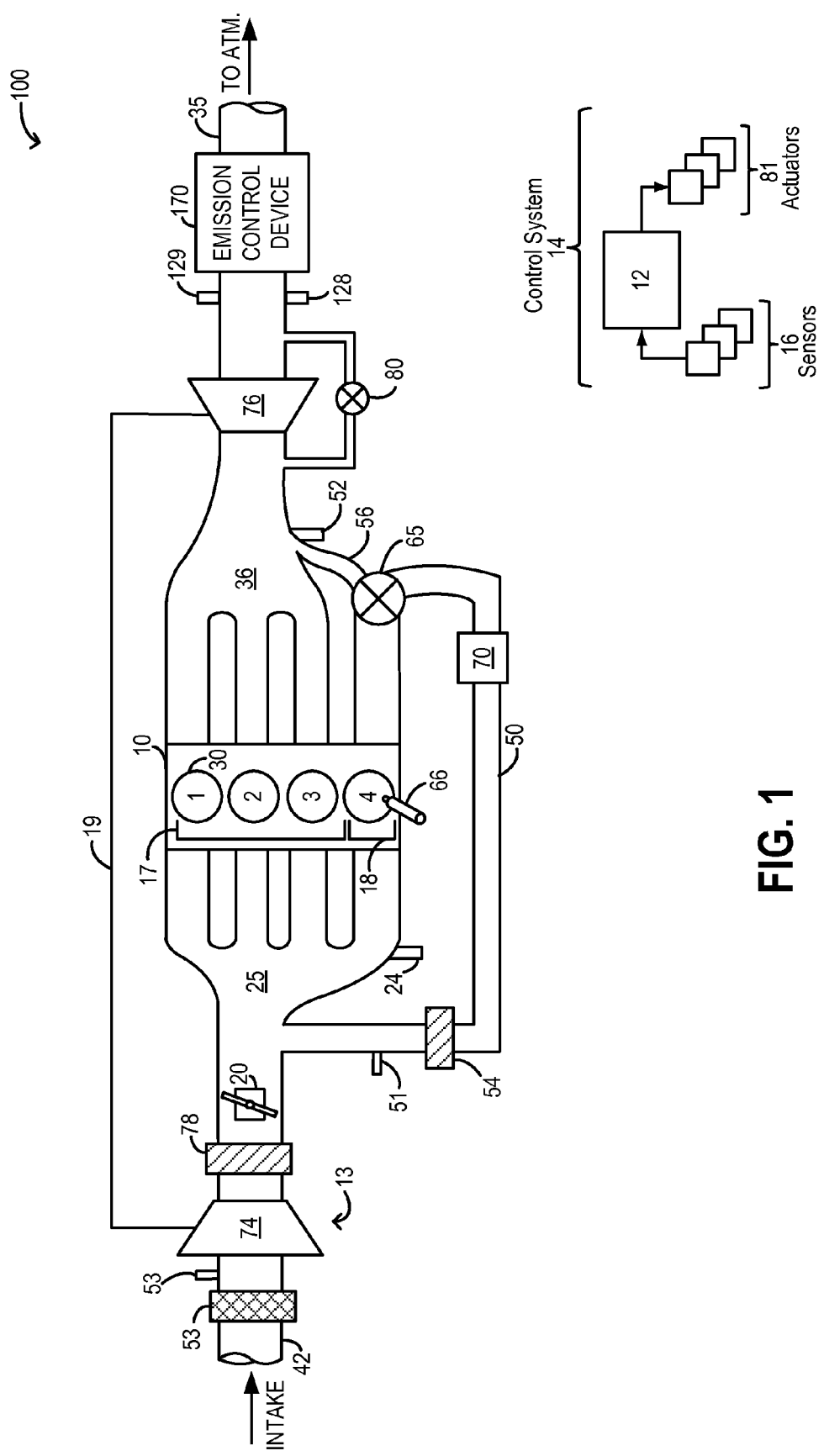
FIG. 1 is a schematic diagram of an engine system including a dedicated EGR donating cylinder group.
Figure 2:
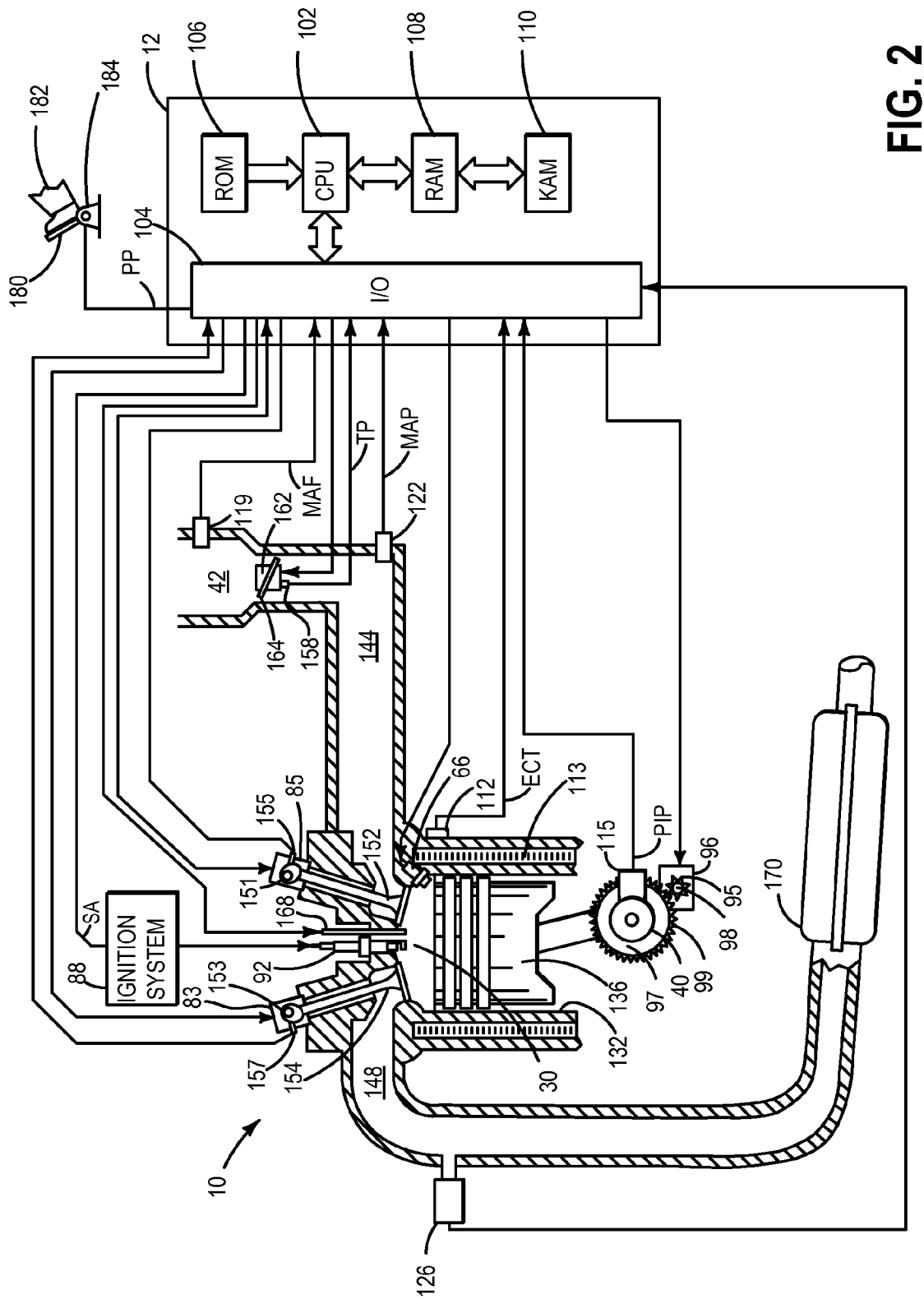
FIG. 2 is a schematic depiction of a combustion chamber of the engine.

The present description is related to EGR flow control on an engine operating with highly diluted cylinder mixtures, such as the engine systems of FIGS. 1-2. The engine cylinder mixtures may be diluted using recirculated exhaust gases (EGR) that are byproducts of combusting air-fuel mixtures. In response to an increase or decrease in EGR demand, such as responsive to a change in engine load, exhaust from the dedicated EGR cylinder group may be diverted to or away from the engine intake. A controller may be configured to perform a control routine, such as the routine of FIGS. 3-4, during a transition between dedicated EGR cylinder operating modes, to reduce torque transients and enable a smooth transition. Therein, the controller may coordinate the adjustment of multiple engine actuators, such as an intake throttle, an exhaust wastegate, spark timing, cam timing and valve timing, during the transition as EGR flow from the dedicated EGR cylinder group varies, to reduce torque transients. An example adjustment for torque transient control is shown with reference to FIG. 5.

FIG. 1 schematically shows aspects of an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

A wastegate 80 may be coupled in series between the inlet and the outlet of exhaust turbine 76. The wastegate may be a normally closed valve configured to open under selected operating conditions to relieve exhaust pressure upstream of the turbine. For example, the wastegate may be opened during conditions of decreasing engine speed to reduce compressor surge and improve turbine performance. As also elaborated herein, during conditions when the engine is transitioning between loads, and while a dedicated EGR cylinder is being deactivated or reactivated, the wastegate opening may be adjusted, in coordination with the opening of an intake throttle, to reduce torque disturbances during the transition.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 36 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed upstream of turbine 76 of exhaust manifold 48 (herein also referred to as a pre-turbine location) via diverter valve 65 and passage 56. By adjusting diverter valve 65, a proportion of exhaust directed from cylinder 4 to the exhaust manifold relative to the intake manifold may be varied. Exhaust catalyst 70 is configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25%) EGR rate can be provided. Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

During high load conditions, the engine may be transitioned out of a dedicated EGR cylinder operating mode by reducing EGR recirculation from the dedicated EGR cylinder group. Therein, the diverter valve opening may be increased to divert more exhaust from the dedicated EGR cylinder group to the pre-turbine location. During low load conditions, the engine may be transitioned in to a dedicated EGR cylinder operating mode by increasing EGR recirculation from the dedicated EGR cylinder group. Therein, the diverter valve opening may be decreased to recirculate more exhaust to the engine intake via the EGR passage. As elaborated herein with reference to FIGS. 3-4, while transitioning in to or out of the dedicated EGR cylinder mode, to compensate for torque transients related to the resulting EGR transients, an engine controller may adjust one or more engine actuators, such as the intake throttle, wastegate, spark timing, cam timing, etc., to enable a smooth transition. In alternate examples, the engine may be transitioned out of the dedicated EGR cylinder operating mode by deactivating fuel and/or valve operation of the dedicated EGR cylinder group. Likewise, the engine may be transitioned in to the dedicated EGR cylinder operating mode by resuming fuel and/or valve operation in the dedicated EGR cylinder group.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group to the remaining engine cylinders. A second exhaust gas sensor 52 may be positioned downstream of the exhaust manifold sections of the first cylinder group for estimating an air-fuel ratio of exhaust in the first cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through wastegate 80, by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 53, exhaust gas temperature and pressure sensors 128 and 129, and exhaust gas oxygen sensors 51, 52. Example actuators include throttle 20, fuel injector 66, dedicated cylinder group valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIGS. 3-4.

Referring to FIG. 2, internal combustion engine 10 comprising a plurality of cylinders as shown in FIG. 1, one cylinder of which is described now. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In some embodiments, dedicated EGR operation may be selectively deactivated by adjusting a position of the diverter valve coupled to the EGR passage to divert some or all of the exhaust gas from the dedicated EGR cylinder to a location upstream of the turbine in the exhaust passage.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 144; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provides for an engine system configured to transition into and out of dedicated EGR cylinder operation while adjusting each of an intake throttle and an exhaust wastegate in opposing directions. When transitioning out of dedicated EGR cylinder operation, and until an engine load reaches a desired load, an engine controller may increase an opening of the intake throttle beyond a throttle position corresponding to the desired load and then resume the throttle position; while concurrently decreasing an opening of the wastegate beyond a wastegate position corresponding to the desired load and then resuming the wastegate position. While adjusting the throttle and the wastegate during the transition, the controller may further adjust cam timing to vary an amount of internal EGR, the cam timing moved transiently beyond a cam timing corresponding to the desired load and then moved to the cam timing corresponding to the desired load. In this way, engine torque is controlled to more closely follow desired torque. Similar actuator adjustments may be used to provide desired torque during a transition where dedicated EGR operation is reactivated.

Figure 3:
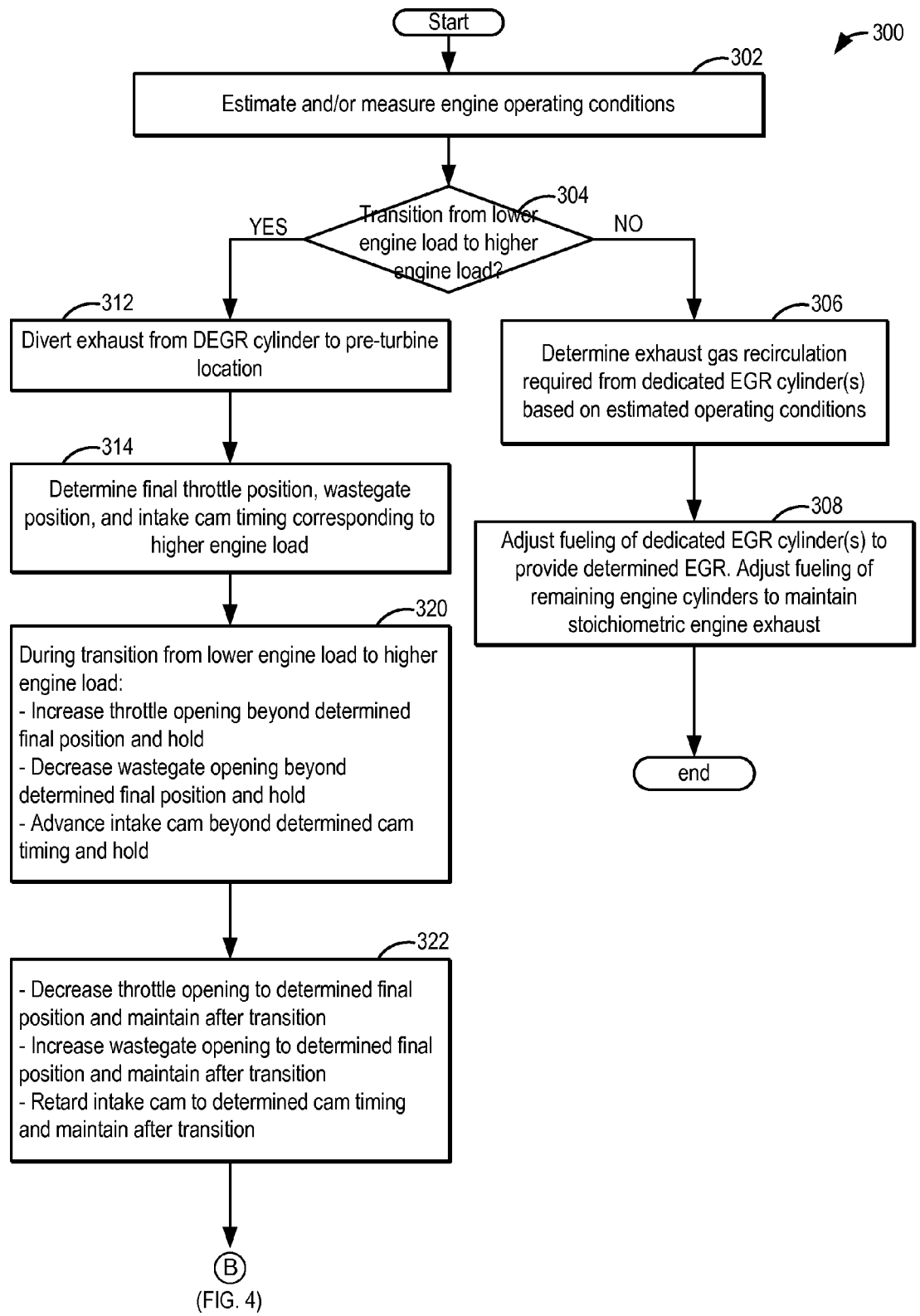
FIGS. 3-4 show an example method for adjusting one or more actuators when transitioning in to or out of dedicated EGR cylinder operation to reduce torque transients.
Figure 4:
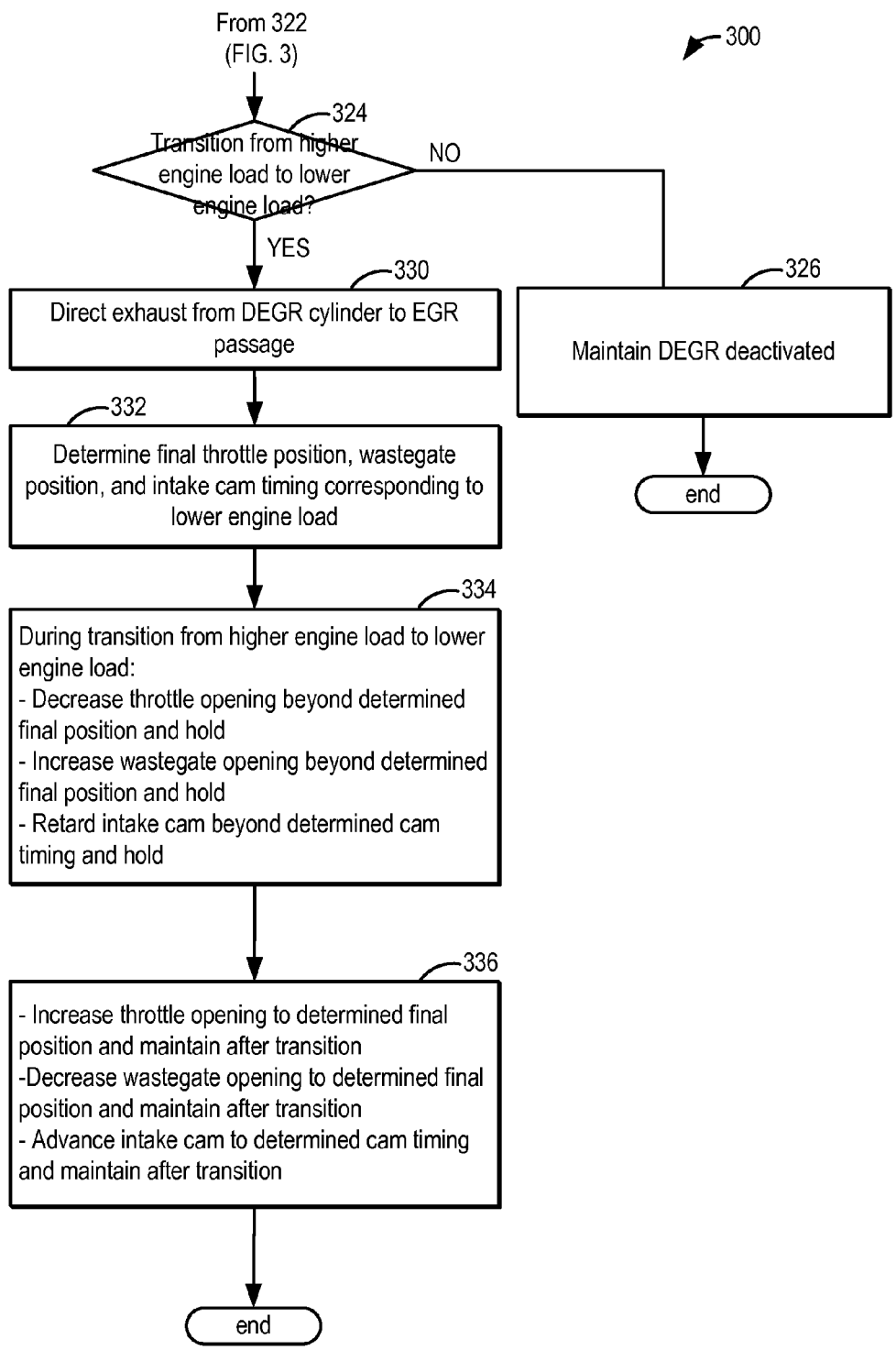

Turning now to FIGS. 3-4, an example method 300 is shown for adjusting parameters of a dedicated EGR cylinder group and remaining engine cylinders of a multi-cylinder engine based on engine operating conditions to maintain desired torque output even as EGR rate is varied.

At 302, the routine includes estimating and/or measuring engine operating conditions such as engine speed, load, boost, MAP, intake air flow, ambient conditions such as ambient pressure, temperature, humidity, catalyst temperature, etc.

At 304, it may be determined if a transition has been commanded from a lower engine load to a higher engine load. In alternate examples, at 304, it may be determined if other conditions have been met for deactivating dedicated EGR operation. As such, the dedicated EGR operation may be deactivated during selected conditions when EGR demand is low, such as when engine load is increasing. Alternatively, the dedicated EGR operation may be deactivated during an engine warm-up condition which may include one of an engine cold-start and an exhaust catalyst temperature being lower than a threshold.

If deactivation conditions are not confirmed, at 306, the routine includes determining an amount of exhaust gas recirculation (EGR) required based on engine operating conditions. Specifically, an amount of engine dilution required may be determined based on the engine operating conditions, and an EGR rate may be determined based on the required engine dilution. As such, the EGR may be provided by recirculating exhaust from only the dedicated EGR cylinder group (for example, from only cylinder 4 of engine 10 in FIGS. 1-2) to all engine cylinders (to all of cylinders 1-4). At 308, a fueling of the dedicated EGR cylinder group may be adjusted to provide the dilution requirement while fueling of the remaining engine cylinders is adjusted to maintain engine exhaust at or around stoichiometry. In one example, to provide the target engine dilution, the dedicated EGR cylinders may be enriched with a degree of richness of the rich fuel injection adjusted to provide the requested amount of exhaust gas recirculation to the remaining engine cylinders by improving the dilution (EGR) tolerance of the engine.

As discussed with reference to FIGS. 1-2, exhaust gas from the dedicated EGR cylinder group may be delivered to a water gas shift catalyst coupled downstream of the dedicated EGR cylinder group before recirculating the exhaust gas to each of the remaining engine cylinders. The water gas shift catalyst uses carbon monoxide and water from the rich exhaust to create extra hydrogen. The hydrogen enriched exhaust is then recirculated to the engine intake. Thus, the hydrogen concentration of the exhaust gas received at the water gas shift catalyst from the dedicated EGR cylinder group is lower than the hydrogen concentration of the exhaust gas recirculated to each of the engine cylinders from the water gas shift catalyst. By recirculating hydrogen rich EGR to the engine, a larger amount of engine dilution can be provided before incurring combustion stability issues. Fuel to each of the remaining engine cylinders is then adjusted based on the air-fuel ratio of the EGR received from the dedicated EGR cylinder group to maintain an exhaust air-fuel ratio of the engine at or around stoichiometry. For example, the remaining engine cylinders may be fueled leaner than stoichiometry as the amount and/or richness of exhaust gas recirculation received from the dedicated EGR cylinder group increases.

If dedicated EGR deactivation conditions are confirmed, then at 312, the routine includes diverting exhaust from the dedicated EGR cylinder group to upstream of the exhaust turbine (that is, a pre-turbine location) by adjusting the position of a diverter valve coupled to the EGR passage. For example, the opening of the diverter valve may be increased. By directing exhaust from the dedicated EGR cylinder group to the pre-turbine location, the engine is transitioned out of a dedicated EGR cylinder operating mode.

At 314, the routine includes determining a final position for each of the intake throttle, exhaust wastegate, and intake cam timing corresponding to the higher load after the transition. For example, the controller may determine a change in position from a current position (or initial position) corresponding to the lower load to a final position corresponding to the higher load.

At 320, the routine includes, while transitioning out of dedicated EGR cylinder operation adjusting at least an intake throttle and an exhaust wastegate, the intake throttle and the exhaust wastegate adjusted in opposing directions. Specifically, when transitioning out of dedicated EGR cylinder operation, until the engine load reaches the desired higher load, the routine includes transiently increasing an opening of the intake throttle beyond a throttle position corresponding to the desired load. Concurrently, the routine includes transiently decreasing an opening of the wastegate beyond a wastegate position corresponding to the desired load. Thus, both the throttle and wastegate are initially actuated to move beyond their target positions (as determined at 312), the throttle and wastegate actuated in opposing directions. The throttle and wastegate are then transiently held in the positions beyond their final positions for a duration while the engine load transitions from the lower load to the higher load. By adjusting the intake throttle to open more than required at the higher load, the actual engine output torque is closer to desired torque during the transition as EGR is purged from the engine intake manifold (and replaced with fresh intake air). At the same time, by closing the wastegate more than required at the higher load, boost pressure can be increased while exhaust is diverted to the pre-turbine location.

Also at 320, the routine includes, while adjusting the throttle and the wastegate, further adjusting an intake cam to vary an amount of internal EGR, the adjusting including, when transitioning out of dedicated EGR cylinder operation, until the engine load reaches the desired load, advancing the intake cam timing beyond a cam timing corresponding to the desired load. By advancing intake cam timing, engine dilution due to internal EGR is reduced. Specifically, an amount of internal residuals in the engine cylinders is reduced, and trapping efficiency is increased, which improves torque output of the engine during the transition.

Each of a degree of increasing the opening of the intake throttle beyond the throttle position and a degree of decreasing the opening of the exhaust wastegate beyond the wastegate position may be based on a difference between engine load at the transitioning and the desired load. For example, as a difference between the lower load (where the transition is started) and the higher load (at the end of the transition) increases, the throttle opening may be increased further beyond the final position and the wastegate opening may be decreased further beyond the final position.

Further, a degree of increasing the opening of the intake throttle beyond the throttle position and a degree of decreasing the opening of the exhaust wastegate beyond may be symmetric or asymmetric. For example, the intake throttle opening may be increased beyond the final position by the same amount that the wastegate opening is decreased beyond the final position. Alternatively, the degree of increasing the opening of the intake throttle beyond the throttle position may be larger than the degree of decreasing the opening of the exhaust wastegate beyond the wastegate position, for example when the desired torque can be achieved with little or no boost increase.

After transiently holding the position of each of the throttle, wastegate, and intake cam at 322, the routine includes moving to the final throttle position corresponding to the higher load, the final wastegate position corresponding to the higher load, and the final intake cam timing corresponding to the higher load. Specifically, the routine includes decreasing the throttle opening to the final position (corresponding to the higher load), increasing the wastegate opening to the final position (corresponding to the higher load), and retarding the intake cam timing to the final timing (corresponding to the higher load). The actuators may then be held at their respective final positions corresponding to the higher load. It will be appreciated however that the actuator adjustments all occur while the engine load is being transitioned and the final positions are resumed before the transition is completed, or at the same time as the transition is completed. That is, the increasing, holding, and then decreasing of the throttle position all occur during the transition from lower engine load to higher engine load. Likewise, the decreasing holding, and then increasing of the wastegate position all occur during the transition from lower engine load to higher engine load.

As such, following deactivation of the dedicated EGR operation, the EGR rate in the intake may start to decrease as the mixed gases in the intake manifold are consumed and gradually replaced with fresh intake air. Initially at the deactivation, there may be a negative torque transient. However, once a sufficient amount of the EGR has been used up or purged and replaced with fresh intake air, a positive torque transient can be experienced due to higher cylinder torque at the lower EGR levels. Thus, by reducing the throttle opening from beyond the final position to the final position, while advancing spark timing to MBT, a torque output of the engine can be adjusted to compensate for the positive torque transient associated with the lower EGR in the engine intake following the deactivating. In this way, the engine torque output is maintained closer to the desired torque even as EGR is purged from the engine. Similarly, additional exhaust gas flow from the dedicated EGR cylinder to the exhaust turbine helps increase turbocharger boost and therefore increase engine torque during the first part of the torque increase when the wastegate position is decreased to its minimum. As engine torque increases, the exhaust flow from all cylinders increases and eventually provides more than the required amount of boost, so wastegate position is increased to its final position to avoid exceeding the desired torque.

In some examples, the throttle and wastegate adjustments may be further based on a flow rate of EGR during the deactivation. For example, the controller may increase engine airflow (and cylinder aircharge) by increasing the opening of the intake throttle while retarding spark timing towards MBT while EGR is above a threshold rate during the deactivating of the dedicated EGR cylinder group (that is, before the EGR has been purged to a threshold amount), and then when EGR is below the threshold rate during the transition, the controller may decrease engine airflow (and cylinder aircharge) by decreasing the opening of the intake throttle while advancing spark timing to MBT. In other words, the increasing and decreasing of the intake throttle position, and the retarding and advancing of the spark timing may be based on the cylinder transition and the EGR rate. Likewise, the controller may increase boost pressure and exhaust flow through the turbine by decreasing the opening of the wastegate while advancing intake cam timing to reduce internal EGR while (external) EGR is above a threshold rate during the deactivating of the dedicated EGR cylinder group (that is, before the EGR has been purged to a threshold amount). Then when EGR is below the threshold rate during the transition, the controller may decrease exhaust flow through the turbine by increasing the opening of the wastegate while retarding intake cam timing. In other words, the increasing and decreasing of the wastegate and the retarding and advancing of the cam timing may also be based on the cylinder transition and the EGR rate.

In some examples, the decreasing of the intake throttle opening after transiently increasing the throttle opening beyond the final position may be further based on engine speed. As such, the engine speed affects the rate of EGR purging. Thus, the intake throttle opening may be decreased faster to the final position corresponding to the higher load after the transition when the engine speed is higher (which is when the EGR is purged faster) and the intake throttle opening may be decreased slower to the final position when the engine speed is lower (which is when the EGR is purged more slowly).

In an alternate embodiment, internal EGR may be controlled with exhaust cam timing instead of intake cam timing, or by a combination of the two. Internal EGR may be increased by retarding exhaust cam timing, by advancing intake cam timing, or by some combination of the two. Similarly, internal EGR may be decreased by advancing exhaust cam timing, by retarding intake cam timing, or by some combination of the two.

It will be further appreciated that in some examples, the output of a torque converter coupled to the engine may also be adjusted during the transition. For example, while the throttle position and the wastegate positions are adjusted during the transition, the controller may unlock and slip a torque converter coupled between the engine and a transmission, a degree of slippage based on a difference between the lower load and the higher load of the transition, or based on differences between desired and actual torque.

From 322, the routine moves to 324 (at FIG. 4) to determine if conditions have been met to reactivate dedicated EGR operation. As such, the dedicated EGR cylinder group may be reactivated during selected conditions when EGR demand is high, such as when a transition from higher engine load to lower engine load is commanded. In alternate examples, the dedicated EGR cylinder group may be reactivated during an engine start only after an emission control device reaches a threshold temperature (e.g., a light off temperature). For example, the EGR cylinder group may be reactivated after an exhaust after-treatment warm-up has been completed, such as after an engine cold-start is completed or after exhaust catalyst temperature is higher than a threshold temperature. If dedicated EGR reactivation conditions have not been met, at 326, the dedicated EGR operation is maintained deactivated. In addition, throttle position, wastegate position, and intake cam timing are held or adjusted based on changes in engine load.

If dedicated EGR reactivation conditions have been met, such as due to a request for transitioning from higher engine load to lower engine load, at 330, the routine includes adjusting the diverter valve in the EGR passage to recirculate exhaust from the dedicated EGR cylinder group to the engine intake manifold. For example, the diverter valve opening may be decreased.

At 334, the routine includes, during the reactivating and while the engine is transitioned from the higher load to the lower load, adjusting each of the intake throttle position, the wastegate position, and intake cam timing to allow for a smooth transition.

Specifically, at 334, the routine includes, transitioning out of dedicated EGR cylinder operation while adjusting at least an intake throttle and an exhaust wastegate, the intake throttle and the exhaust wastegate adjusted in opposing directions. In particular, when transitioning in to dedicated EGR cylinder operation, until the engine load reaches the desired load, the routine includes decreasing the opening of the intake throttle beyond the throttle position corresponding to the desired load and concurrently increasing an opening of the wastegate beyond a wastegate position corresponding to the desired load. Thus, both the throttle and wastegate are initially actuated to move beyond their target positions, the throttle and wastegate actuated in opposing directions. The throttle and wastegate are then transiently held in the positions beyond their final positions for a duration while the engine load transitions from the higher load to the lower load. By adjusting the intake throttle to close more than required at the lower load, torque is quickly reduced to the desired level, despite increasing intake manifold pressure due to inflow of exhaust gas from the dedicated EGR cylinder. Similarly, by opening the wastegate more than required at the lower load, boost pressure can be reduced quickly while exhaust is recirculated to the engine intake.

Also at 334, the routine includes, while adjusting the throttle and the wastegate, further adjusting an intake cam to vary an amount of internal EGR, the adjusting including, when transitioning in to dedicated EGR cylinder operation, until the engine load reaches the desired load, retarding the intake cam timing beyond a cam timing corresponding to the desired load.

As with the transition during the deactivation, each of a degree of decreasing the opening of the intake throttle beyond the throttle position and a degree of increasing the opening of the exhaust wastegate beyond the wastegate position may be based on a difference between engine load at the transitioning and the desired load. For example, as a difference between the higher load (where the transition is started) and the lower load (at the end of the transition) increases, the throttle opening may be decreased further beyond the final position and the wastegate opening may be increased further beyond the final position.

After transiently holding the position or timing of each of the throttle, wastegate, and intake cam, at 336 the routine includes resuming the final throttle position corresponding to the lower load, the final wastegate position corresponding to the lower load, and the final intake cam timing corresponding to the lower load. Specifically, the routine includes increasing the throttle opening to the final position (corresponding to the lower load), decreasing the wastegate opening to the final position (corresponding to the lower load), and advancing the intake cam timing to the final timing (corresponding to the lower load). The actuators may then be held at their respective final positions corresponding to the lower load. It will be appreciated however that the actuator adjustments all occur while the engine load is being transitioned and the final positions are resumed before the transition is completed, or at the same time as the transition is completed. That is, the decreasing, holding, and then increasing of the throttle position all occur during the transition from higher engine load to lower engine load. Likewise, the increasing holding, and then decreasing of the wastegate position all occur during the transition from higher engine load to lower engine load.

As such, following reactivation of dedicated EGR operation, the EGR rate in the intake may start to increase as EGR gases gradually build up in the intake manifold. Initially after the reactivation, while the EGR rate rises, there may be a positive torque transient. However, once sufficient amount of the EGR has been built up and fresh intake air has been replaced, a negative torque transient can be experienced due to lower cylinder torque at the higher EGR levels.

In some examples, the throttle and wastegate adjustments may be further based on a flow rate of EGR during the reactivation. For example, the controller may increase engine airflow (and cylinder aircharge) by increasing the opening of the intake throttle while retarding spark timing towards MBT while EGR is below a threshold rate during the reactivating of the dedicated EGR cylinder group (that is, before the EGR has been filled to a threshold amount), and then when EGR is above the threshold rate during the transition, the controller may decrease engine airflow (and cylinder aircharge) by decreasing the opening of the intake throttle while advancing spark timing to MBT. In other words, the increasing and decreasing of the intake throttle position, and the retarding and advancing of the spark timing may be based on the cylinder transition and the EGR rate. Likewise, the controller may increase boost pressure and exhaust flow through the turbine by decreasing the opening of the wastegate while advancing intake cam timing while (external) EGR is below a threshold rate during the reactivating of the dedicated EGR cylinder group (that is, before the EGR has been filled to a threshold amount). Then when EGR is above the threshold rate during the transition, the controller may decrease exhaust flow through the turbine by increasing the opening of the wastegate while retarding intake cam timing. In other words, the increasing and decreasing of the wastegate and the retarding and advancing of the cam timing may also be based on the cylinder transition and the EGR rate.

It will be appreciated that the decreasing of the intake throttle opening after the reactivating of the dedicated EGR cylinder group may be further based on engine speed. As such, the engine speed affects the rate of EGR gases building up in the intake manifold. Thus, the intake throttle opening may be decreased faster when the engine speed is higher (which is when the EGR is built up faster) and the intake throttle opening may be decreased more slowly when the engine speed is lower (which is when the EGR is built up more slowly).

It will also be appreciated that in still other examples, torque converter slippage may be used to modulate the engine torque. For example, during the deactivation, torque converter slippage may be initially increased and then decreased. Likewise, during the reactivation, torque converter slippage may be initially decreased and then increased.

Figure 5:
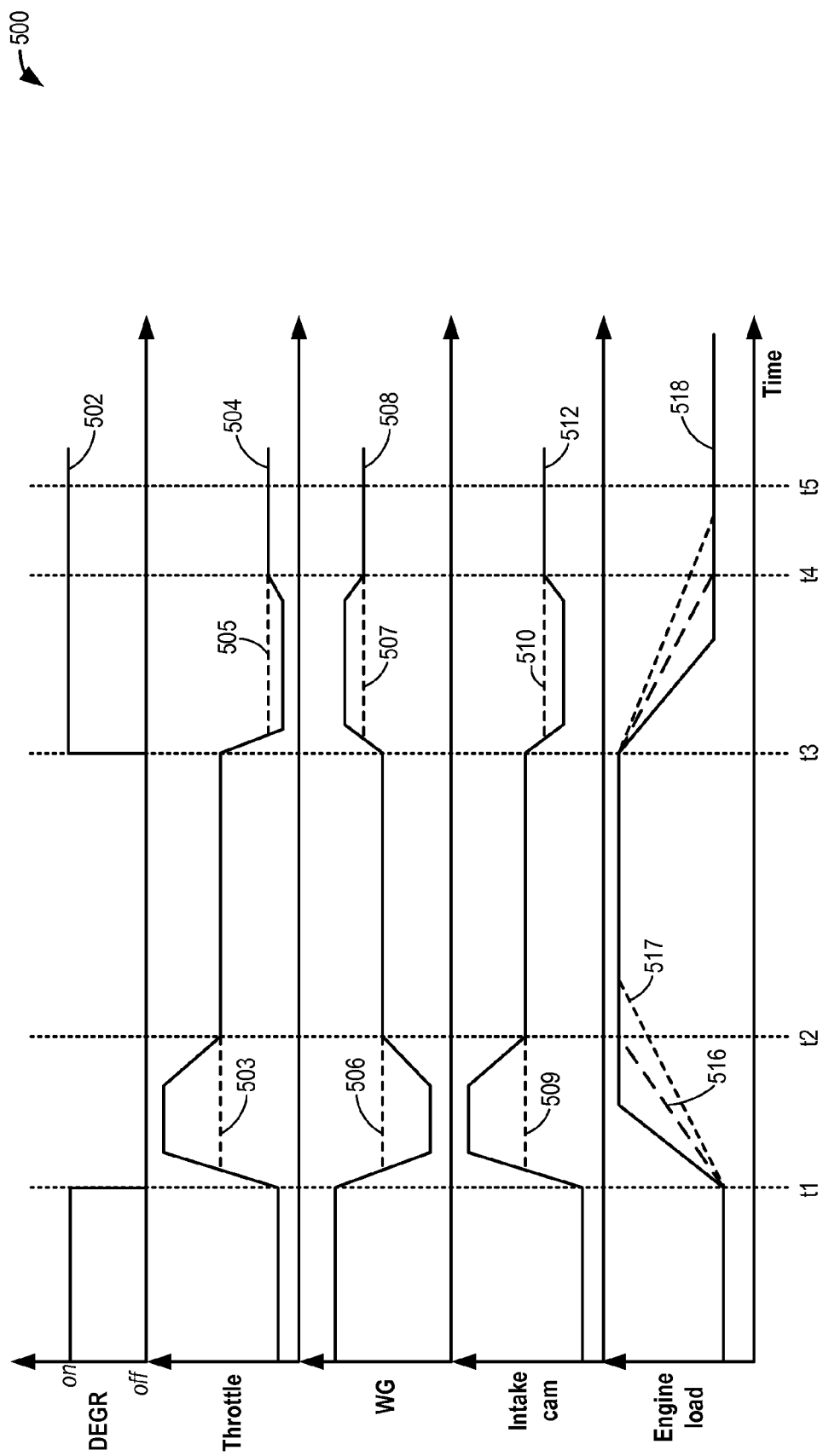
FIG. 5 show example actuator adjustments used when transitioning in to or out of dedicated EGR cylinder operation to enable a smooth transition.

Now turning to FIG. 5, scenario 500 depicts example actuator adjustments occurring while dedicated EGR operation is deactivated and reactivated. Map 500 depicts deactivation or reactivation of dedicated EGR at plot 502, intake throttle position at plot 504, wastegate position at plot 508, intake cam position at plot 512, and engine load (torque) at plot 518. All plots are shown over time (along the x-axis).

Prior to t1, the engine may be operating with exhaust being recirculated from a dedicated EGR cylinder (DEGR) to the engine intake so that EGR is provided from the DEGR cylinders all engine cylinders. Thus, prior to t1, DEGR may be provided at a substantially fixed rate. In addition, throttle opening may be adjusted based on engine load. Also, wastegate opening may be adjusted based on boost demand and cam timing of all engine cylinders may be adjusted based on desired intake valve timing.

At t1, an increase in engine load may be requested (solid line 518). The increase in engine load may require a reduction in engine dilution. At tl, a transition from the lower load to the higher load is initiated, the actual transition completed by t2 (long dashed line 516). In response to the demand for higher engine load, at t1, DEGR cylinder operation may be deactivated by diverting exhaust from the DEGR cylinder from the EGR passage to the exhaust manifold upstream of an exhaust turbine.

To achieve the desired torque increase as quickly as possible while purging EGR gases from the intake manifold, during the transition (between t1 and t2), engine intake airflow may be increased. In particular, between t1 and t2, the intake throttle opening is increased from an initial position corresponding to the lower load to beyond a final position 503 corresponding to the higher load. The throttle is then transiently held at the higher than final position before the throttle opening is returned to the final position 503 by the time the transition is completed at t2. By increasing throttle opening, intake airflow is increased to quickly purge EGR gases and intake manifold pressure is quickly increased to provide higher torque despite the remaining EGR gases entering the cylinders.

While the throttle opening is increased beyond the final position 503 and then returned to the final position, between t1 and t2, the wastegate opening is decreased from an initial position corresponding to the lower load to beyond a final position 506 corresponding to the higher load. The wastegate is then transiently held at the lower than final position before the wastegate opening is returned to the final position 506 by the time the transition is completed at t2. By decreasing wastegate opening, exhaust pressure at the turbine is increased, thus increasing turbocharger speed and intake manifold pressure to quickly provide the desired torque.

Also between t1 and t2, an intake cam timing is advanced from an initial position corresponding to the lower load to beyond a final position 509 corresponding to the higher load. The intake cam is then transiently held at the more advanced than final position before the intake cam is returned to the final position 509 by the time the transition is completed at t2. By advancing the intake cam timing, an amount of internal EGR is reduced, further reducing the residual content of aircharge received in the non-dedicated EGR cylinders. Thus, during the deactivation, as EGR is purged out of the intake manifold and exhaust is diverted to a pre-turbine location, the torque output of the engine is increased so as to achieve the desired torque as quickly and smoothly as possible.

As such, if the throttle were directly moved to final position 503 without the overshoot, the wastegate were directly moved to final position 506 without the undershoot, and the intake cam were directly moved to final position 509 without the overshoot, the transition to higher engine load would have been completed after t2, as shown by smaller dashed line 517. This may be at least due to torque disturbances caused during the transition necessitating additional actuator adjustments.

At t3, engine load may be transitioned from the higher load to a lower load. The decrease in engine load may require an increase in engine dilution. In response to the decrease in engine load, the DEGR cylinder may be reactivated so that the engine EGR rate can be rapidly increased. At t3, a decrease in engine load may be requested (solid line 518). At t3, a transition from the higher load to the lower load is initiated, the actual transition completed by t4 (long dashed line 516). In response to the demand for lower engine load, at t3, the DEGR cylinder operation may be reactivated by resuming recirculation of exhaust to the intake manifold. During the reactivation, the torque output of the engine changes due to a combination of rising intake manifold pressure from EGR flow, increasing dilution with EGR gases, and falling intake manifold pressure due to decreased turbine work.

To ensure a smooth change in engine torque anticipated at t3 due to reactivation of DEGR flow, during the transition (between t3 and t4), engine parameters must be carefully controlled. In particular, between t3 and t4, the intake throttle opening is adjusted from an initial position corresponding to the higher load to beyond a final position 505 corresponding to the lower load. The throttle is then transiently held at the lower than final position before the throttle opening is returned to the final position 505 by the time the transition is completed at t3.

While the throttle opening is decreased beyond the final position 505 and then returned to the final position, between t3 and t4, the wastegate opening is increased from an initial position corresponding to the lower load to beyond a final position 507 corresponding to the higher load. The wastegate is then transiently held at the higher than final position before the wastegate opening is returned to the final position 507 by the time the transition is completed at t4. By increasing wastegate opening, exhaust pressure at the turbine is decreased.

Also between t3 and t4, an intake cam timing is retarded from an initial position corresponding to the higher load to beyond a final position 510 corresponding to the lower load. The intake cam is then transiently held at the more retarded than final position before the intake cam is returned to the final position 510 by the time the transition is completed at t4. Thus, during the reactivation of DEGR, as exhaust is recirculated to the intake manifold, internal EGR can be increased before DEGR gases reach the cylinders.

As such, if the throttle were directly moved to final position 505 without the undershoot, the wastegate were directly moved to final position 507 without the overshoot, and the intake cam were directly moved to final position 510 without the undershoot, the transition to lower engine load would have been completed after t4, as shown by smaller dashed line 517. This may be at least due to torque disturbances caused during the transition necessitating additional actuator adjustments.

It will be appreciated that while the example of FIG. 5 shows the throttle and wastegate adjustments being performed during reactivation of a dedicated EGR cylinder responsive to a decrease in engine load, in alternate examples, the throttle and wastegate position adjustments may be performed when the dedicated EGR cylinder is reactivated during an engine start only after an emission control device reaches a threshold temperature.

In this way, during a transition from a lower load to a higher load, a controller may deactivate dedicated EGR flow to an engine intake; move a throttle from a first throttle position based on the lower load to beyond a second throttle position based on the higher load before returning to the second throttle position, the second throttle position more open than the first throttle position. Further, while moving the throttle, the controller may move a wastegate from a first wastegate position based on the lower load to beyond a second wastegate position based on the higher load before returning to the second wastegate position, the second wastegate position more closed than the first wastegate position. Herein, the dedicated EGR operation is deactivated responsive to the transition from lower load to higher load, the dedicated EGR operation being reactivated during a transition from the higher load to the lower load. Deactivating the dedicated EGR operation includes diverting exhaust from the dedicated cylinder from the EGR passage to the exhaust manifold upstream of an exhaust turbine.

While moving the throttle and the wastegate, the controller may adjust an intake cam timing from a first timing based on the lower load to beyond a second timing based on the higher load before resuming the second timing. Further still, while moving the throttle and the wastegate, the controller may slip a torque converter coupled to the engine, a degree of slippage based on a difference between the lower load and the higher load.

In one example, an engine system, comprises: an engine including a first and a second cylinder group; a turbine coupled to an exhaust passage; a wastegate coupled across the turbine; an EGR passage configured to recirculate exhaust from only the first cylinder group to an engine intake supplying aircharge to each of the first and second cylinder group; a valve coupled to the EGR passage for diverting at least a portion of the exhaust from the first cylinder group to the exhaust passage, upstream of the turbine; a throttle coupled to the engine intake for varying an amount of aircharge to the cylinder groups; and a spark plug coupled to each engine cylinder. The engine system further includes a controller with computer-readable instructions stored on non-transitory memory for: in response to a transition from lower engine load to higher engine load, opening the valve to divert exhaust from the first cylinder group to upstream of the turbine. Then, during the transition, the controller is configured to increase throttle opening beyond a throttle opening corresponding to the higher load while decreasing wastegate opening beyond a wastegate opening corresponding to the higher load. The controller may then hold the throttle and the wastegate at the increased and decreased opening for a duration before returning the throttle and the wastegate to the opening corresponding to the higher load.

In this way, torque transients can be better managed in a dedicated EGR engine system even as dedicated EGR operation is deactivated or reactivated to vary engine dilution. By transitioning between cylinder deactivation and reactivation on a dedicated EGR cylinder, engine dilution can be rapidly varied in an engine system. By using actuator adjustments to reduce torque transients as EGR is being ramped in to a reactivated dedicated EGR operation, or being ramped out of a deactivated dedicated EGR operation, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine including a dedicated EGR cylinder group, comprising:
transitioning into and out of dedicated EGR operation while adjusting each of an intake throttle and an exhaust wastegate in opposing directions and in both increasing and decreasing directions during each of the transitions,
wherein the wastegate is coupled across an exhaust turbine,
wherein transitioning out of dedicated EGR operation includes diverting exhaust from the dedicated EGR cylinder group to upstream of the exhaust turbine, and transitioning into dedicated EGR operation includes recirculating exhaust from the dedicated EGR cylinder group to an engine intake, downstream of the throttle, and
wherein adjusting each of the intake throttle and the wastegate includes:
when transitioning out of dedicated EGR operation, until an engine load reaches a desired load,
increasing an opening of the intake throttle beyond a final throttle position corresponding to the desired load and then resuming the final throttle position.

2. A method for an engine including a dedicated EGR cylinder group, comprising:
transitioning into and out of dedicated EGR operation while adjusting each of an intake throttle and an exhaust wastegate in opposing directions, wherein the wastegate is coupled across an exhaust turbine, and wherein transitioning out of dedicated EGR operation includes diverting exhaust from the dedicated EGR cylinder group to upstream of the exhaust turbine, and transitioning in to dedicated EGR operation includes recirculating exhaust from the dedicated EGR cylinder group to an engine intake, downstream of the throttle, and wherein adjusting each of the intake throttle and the wastegate includes:
when transitioning out of dedicated EGR operation, until an engine load reaches a desired load,
increasing an opening of the intake throttle beyond a final throttle position corresponding to the desired load and then resuming the final throttle position.

3. The method of claim 2, wherein the adjusting further includes, while increasing the opening of the intake throttle, concurrently decreasing an opening of the wastegate beyond a final wastegate position corresponding to the desired load and then resuming the final wastegate position.

4. The method of claim 3, wherein each of a degree of increasing the opening of the intake throttle beyond the final throttle position and a degree of decreasing the opening of the wastegate beyond the final wastegate position is based on a difference between engine load at the transitioning and the desired load.

5. The method of claim 4, wherein the degree of increasing the opening of the intake throttle beyond the final throttle position is larger than the degree of decreasing the opening of the wastegate beyond the final wastegate position.

6. The method of claim 5, further comprising, while adjusting the throttle and the wastegate, further adjusting a cam timing to vary an amount of internal EGR, the adjusting including, when transitioning out of dedicated EGR operation, until the engine load reaches the desired load, changing the cam timing beyond a cam timing corresponding to the desired load and then resuming the cam timing corresponding to the desired load.

7. The method of claim 6, wherein adjusting each of the intake throttle and the wastegate further includes:
when transitioning in to dedicated EGR operation, until the engine load reaches the desired load,
decreasing the opening of the intake throttle beyond a throttle position corresponding to the desired load and then resuming the throttle position; and
concurrently increasing the opening of the wastegate beyond a wastegate position corresponding to the desired load and then resuming the wastegate position.

8. The method of claim 7, further comprising, when transitioning in to dedicated EGR operation, until the engine load reaches the desired load,
changing the cam timing beyond the cam timing corresponding to the desired load and then resuming the cam timing corresponding to the desired load.

9. A method for an engine, comprising:
during a transition from a lower load to a higher load,
deactivating operation of dedicated EGR to an engine intake;
moving a throttle from a first throttle position based on the lower load to beyond a second throttle position based on the higher load before returning to the second throttle position, the second throttle position more open than the first throttle position; and
while moving the throttle, moving a wastegate from a first wastegate position based on the lower load to beyond a second wastegate position based on the higher load before returning to the second wastegate position, the second wastegate position more closed than the first wastegate position.

10. The method of claim 9, wherein dedicated EGR operation is deactivated responsive to the transition from the lower load to the higher load, the dedicated EGR operation reactivated during a transition from the higher load to the lower load.

11. The method of claim 9, wherein deactivating dedicated EGR operation includes adjusting a diverter valve to divert exhaust from a dedicated cylinder to upstream of an exhaust turbine.

12. The method of claim 9, further comprising, while moving the throttle and the wastegate, adjusting a cam timing from a first timing based on the lower load to beyond a second timing based on the higher load before resuming the second timing.

13. The method of claim 9, wherein a difference between the first and second throttle positions is larger than a difference between the first and second wastegate positions.

14. The method of claim 9, further comprising, while moving the throttle and the wastegate, slipping a torque converter coupled to the engine, a degree of slippage based on a difference between the lower load and the higher load.

* * * * *